United States Patent Office 3,766,270
Patented Oct. 16, 1973

3,766,270
ALKYLAMINOOXANIL OXIMES
Heinrich Hiller, Mannheim, and Adolf Fischer, Mutterstadt, Germany, assignors to Badische Anilin- & Soda-Fabrik Aktiengesellschaft, Ludwigshafen (Rhine), Germany
No Drawing. Filed June 9, 1971, Ser. No. 151,559
Int. Cl. C07c *103/30*
U.S. Cl. 260—562 N   3 Claims

ABSTRACT OF THE DISCLOSURE

Substituted alkylaminooxanil oximes having a good herbicidal action in controlling the growth of unwanted plants.

---

The present invention relates to new and valuable alkylaminooxanil oximes having a good herbicidal action and the use of these compounds as herbicides.

It is known to use methyl 3-(N-3′-methylphenylcarbamoyloxy)-phenylcarbamate as a herbicide. However, its action is not satisfactory.

We have now found that substituted alkylaminooxanil oximes of the formula

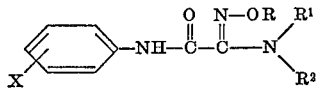

where X denotes hydrogen, halogen (chlorine, bromine), nitro, cyano, alkyl of 1 to 5 carbon atoms (methyl, ethyl, propyl, isopropyl, n-butyl, isobutyl), alkoxy (methoxy) or haloalkyl (trifluoromethyl), R and $R^1$ each denote hydrogen or alkyl (methyl, ethyl) and $R^2$ denotes alkyl (methyl, ethyl) which may be substituted by halogen (chlorine, bromine), have an extremely good herbicidal action.

The new compounds may be prepared by reacting chlorooxanil oxime with aliphatic primary or secondary amines in the presence of a solvent (ethanol) at temperatures of from 40° to 100° C.

EXAMPLE 1

Chlorooxanil oxime may be prepared in known manner from isonitrosoacetanilide by chlorination (Karrer, Helv. chim. acta, 7, 1038).

19.9 parts (by weight) of chlorooxanil oxime is dissolved in 150 parts of ethanol; a solution of 9 parts of dimethylamine in 50 parts of ethanol is then added. The mixture is heated under reflux for 30 minutes and the solvent subsequently distilled off in vacuo. An oil remains as residue. The yield is 20.7 parts (100% of theory) of dimethylaminooxanil oxime, having the formula

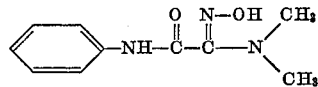

together with 8.1 parts of dimethylammonium chloride which is not removed.

$n_D^{25}$: 1.5334

EXAMPLE 2

Adopting the procedure described in Example 1, 19.9 parts of chlorooxanil oxime is reacted with 14.6 parts of n-butylamine. Yield: 23.5 parts (100% of theory) of n-butylaminooxanil oxime, having the formula

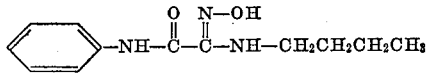

together with 11 parts of n-butylammonium chloride which is not removed.

Oil, $n_D^{25}$: 1.5156

The following compounds may be prepared analogously: ethylaminooxanil oxime; diethylaminooxanil oxime; propylaminooxanil oxime; dipropylaminooxanil.

The agents according to the invention may be used as solutions, emulsions, suspensions or dusts. The form of application depends entirely on the purpose for which the agents are being used; in any case it should ensure a fine distribution of the active ingredient.

For the preparation of solutions to be sprayed direct, the solution in water is suitable. However, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may also be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g. polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g. kieselguhr, talc, clay or fertilizers.

It is possible to mix the active ingredients with fungicides, insecticides or with other herbicidal active ingredients.

The herbicidal action of the new compounds is particularly in evidence on Poa spp., Lolium spp., Echinochloa spp., and Setaria spp., and they are particularly suitable for controlling unwanted plants in the following crops: Beta spp., Zea mays, and Gossypium spp. Application rates range from 0.5 to 5 kg. of active ingredient per hectare. The substances may be applied either pre- or postemergence.

EXAMPLE 3

On an agricultural plot the plants *Beta vulgaris, Poa annua, Poa trivialis, Echinochloa crus-galli, Sinapis arvensis* and *Matricaria chamomilla* were treated at a growth height of 2 to 7 cm. with 1.5 kg. per hectare of dimethylaminooxanil oxime (I) and, for comparison, with 1.5 kg. per hectare of methyl 3-(N-3′-methylphenylcarbamoyloxy)-phenylcarbamate (II), each active ingredient being dispersed in 500 liters of water per hectare. After 3 to 4 weeks it was ascertained that I had a superior herbicidal action to II, combined with the same good crop plant compatibility.

The results of the experiment are given in the following table:

| Active ingredient | I | II |
|---|---|---|
| Crop plant: *Beta vulgaris* | 0 | 0 |
| Unwanted plants: | | |
| *Poa annua* | 95 | 40 |
| *Poa trivialis* | 95 | 30 |
| *Echinochloa crus-galli* | 80 | 30 |
| *Sinapis arvensis* | 100 | 100 |
| *Matricaria chamomilla* | 100 | 45 |

NOTE: 0=no damage. 100=complete destruction.

EXAMPLE 4

In a greenhouse, loamy sandy soil was filled into pots and sown with the seeds of *Beta vulgaris, Zea mays, Poa trivialis, Avena fatua, Sinapis arvensis* and *Chenopodium album*. The soil prepared in this manner is subsequently treated with 2 kg. per hectare of dimethylaminooxanil oxime (I) dispersed in 500 liters of water per hectare. After 4 to 5 weeks it was ascertained that all the unwanted plants had completely withered, whereas *Beta vulgaris* and *Zea mays* continued to grow undamaged.

EXAMPLE 5

90 parts by weight of compound I is mixed with 10 parts by weight of N-methyl-α-pyrrolidone. A mixture is obtained which is suitable for application in the form of very fine drops.

EXAMPLE 6

20 parts by weight of the compound of Example 2 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 7

20 parts by weight of compound I is dissolved in a mixture consisting of 40 parts by weight of cyclohexanone, 30 parts by weight of isobutanol, 20 parts by weight of the adduct of 7 moles of ethylene oxid to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 8

20 parts by weight of the compound of Example 2 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 9

20 parts by weight of compound I is well mixed with 3 parts by weight of the sodium salt of diisobutylnaphthalene-α-sulfonic acid, 17 parts by weight of the sodium salt of a ligninsulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 10

3 parts by weight of compound I is intimately mixed with 97 parts by weight of particulate kaolin. A dust is obtained containing 3% by weight of the active ingredient.

EXAMPLE 11

30 parts by weight of compound I is intimately mixed with a mixture consisting of 92 parts by weight of powdered silica gel and 8 parts by weight of paraffin oil which has been sprayed onto the surface of this silica gel. A formulation of the active ingredient is obtained having good adherence.

We claim:

1. A substituted alkylaminooxanil oxime of the formula

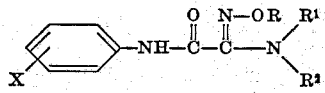

where X denotes hydrogen, chlorine, bromine, nitro, cyano, alkyl of 1 to 5 carbon atoms, methoxy or trifluoromethyl, R denotes hydrogen, methyl or ethyl, $R^1$ denotes hydrogen or alkyl of 1 to 4 carbon atoms, and $R^2$ denotes alkyl of 1 to 4 carbon atoms.

2. The compound of the formula

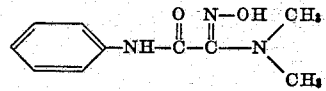

3. The compound of the formula

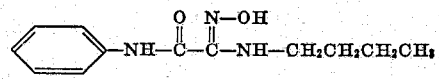

References Cited
UNITED STATES PATENTS 3,624,151   11/1971   Gutman _____ 260—562

HARRY I. MOATZ, Primary Examiner

U.S. Cl. X.R.

71—118; 260—465 D

UNITED STATES PATENT OFFICE
CERTIFICATE OF CORRECTION

Patent No. 3,766,270        Dated October 16, 1973

Inventor(s) Heinrich Hiller and Adolf Fischer

It is certified that error appears in the above-identified patent and that said Letters Patent are hereby corrected as shown below:

First page, left-hand column, ninth line, insert
-- [30]    Foreign Application Priority Data
        June 27, 1970   Germany . . . . P 20 31 922.6 --.

Column 2, line 3, insert -- oxime -- after "dipropylaminooxanil".

Column 2, line 69, insert -- Poa annua -- after "Zea mays".

Column 3, line 27, "oxid" should read -- oxide --.

Signed and sealed this 17th day of September 1974.

(SEAL)
Attest:

McCOY M. GIBSON JR.
Attesting Officer

C. MARSHALL DANN
Commissioner of Patents